United States Patent [19]
Marcott et al.

[11] Patent Number: 5,489,005
[45] Date of Patent: Feb. 6, 1996

[54] ELECTRO-HYDRAULIC STEERING SYSTEM

[75] Inventors: Tony L. Marcott, Plainfield; David E. Nelson; Noel J. Rytter, both of Peoria, all of Ill.

[73] Assignee: Caterpillar Inc., Peoria, Ill.

[21] Appl. No.: 344,048

[22] Filed: Nov. 23, 1994

[51] Int. Cl.[6] .............................. B62D 6/00; B62D 13/02
[52] U.S. Cl. ................................................... 180/134
[58] Field of Search ............................................. 180/134

[56] References Cited

U.S. PATENT DOCUMENTS

| | | | |
|---|---|---|---|
| 3,439,768 | 4/1969 | Medley | 180/134 |
| 3,943,824 | 3/1976 | Fletcher | 91/363 |
| 4,811,806 | 3/1989 | Lang | 180/141 |
| 5,174,597 | 12/1992 | Uttenthaler | 180/134 |

FOREIGN PATENT DOCUMENTS

| | | | |
|---|---|---|---|
| 74269 | 3/1991 | Japan | 180/134 |
| 765083 | 9/1980 | U.S.S.R. | 180/134 |

Primary Examiner—Mitchell J. Hill
Attorney, Agent, or Firm—J. W. Burrows

[57] ABSTRACT

In machines that are articulated in response to a steer input mechanism, it is many times necessary for the operator to make a steer input and then to make corrective adjustments in order to obtain the desired steer angle of the machine. In the subject invention, an electro-hydraulic steering system is provided which senses the desired steer input by the operator, senses the degree of articulation of the machine and a microprocessor delivers an electrical control signal (P) to an electro-hydraulic valve mechanism which effectively controls articulation of the machine. Once the machine has reached the degree of articulation desired by the operator, the microprocessor signals the electro-hydraulic valve mechanism to stop articulation of the machine. Consequently, the operator does not have to provide any adjustments thereto. Additionally, the ground speed of the machine is sensed and the rate of articulation is controlled in response thereto. In the subject arrangement, in the event of an electrical system failure, a back-up steering control circuit is automatically functional to control steering of the machine in a conventional manner. This arrangement provides an electro-hydraulic steering system that eases the operators fatigue by eliminating the need for corrective steer adjustments and is simple in construction and reliable in operation.

8 Claims, 2 Drawing Sheets

ELECTRO-HYDRAULIC STEERING SYSTEM

TECHNICAL FIELD

This invention relates generally to an electro-hydraulic steering system and more particularly to an electro-hydraulic steering system for use in an articulated machine.

BACKGROUND ART

In many articulated machines known, the steering of the machine is accomplished by the operator providing a steer input and, then in order to stop the steering, he must return the steering wheel to its centered position and at times even turn the steering wheel in the reverse direction in order to fully stop the steering. This known type of steering works well, however, the operator must continually make various steer inputs in order to achieve a desired steering angle. Furthermore, many known systems provide emergency steering in the event the primary mode of steering fails. However, in some steering arrangements, detecting the failure of the primary steering is at times difficult and/or unreliable. It is desirable to provide an electro-hydraulic system that reduces operator fatigue, improves steering performance and provides a backup steering that automatically provides emergency steering in the event the primary steering fails.

The present invention is directed to overcoming one or more of the problems as set forth above.

DISCLOSURE OF THE INVENTION

In one aspect of the present invention, an electro-hydraulic steering system is provided and adapted for use on an articulated machine having a steer input mechanism that is responsive to an operator's input, a pair of articulation cylinders, a hydraulic pump, a source of pressurized control fluid and a directional control valve that is operatively connected between the hydraulic pump and the pair of articulation cylinders. The electro-hydraulic steering system includes a first sensor mechanism that is operative to sense the degree of steer input from the steering mechanism and deliver an electrical command signal therefrom representative of the desired steer angle. A second sensor mechanism is provided and operative to sense the degree of articulation of the machine and deliver an electrical feedback signal therefrom that is representative of the angle of articulation. The system also includes an electro-hydraulic valve mechanism that is operatively connected between the source of pressurized control fluid and the directional control valve to control movement of the directional control valve. A microprocessor is provided and operative to receive and compare the electrical signals from the first and second sensor mechanisms and deliver an electrical control signal to the electro-hydraulic valve mechanism to actuate the directional control valve in response to the control signal that is representative of the desired steer angle and to deactivate the directional control valve in response to the feedback signal from the second sensor mechanism once the desired articulation angle is achieved.

The present invention provides an electro-hydraulic steering mechanism that effectively reduces operator fatigue by reducing the frequency of steer adjustments required by the operator, increasing the accuracy of the steering and providing better maneuverability. The electro-hydraulic steering system also provides a primary steering arrangement that in the event of failure of the electrical system, a back-up steering arrangement is automatically effective to provide steering of the machine. The subject invention is a simple arrangement and reliable in operation.

BEST MODE FOR CARRYING OUT THE INVENTION

Figure 1:
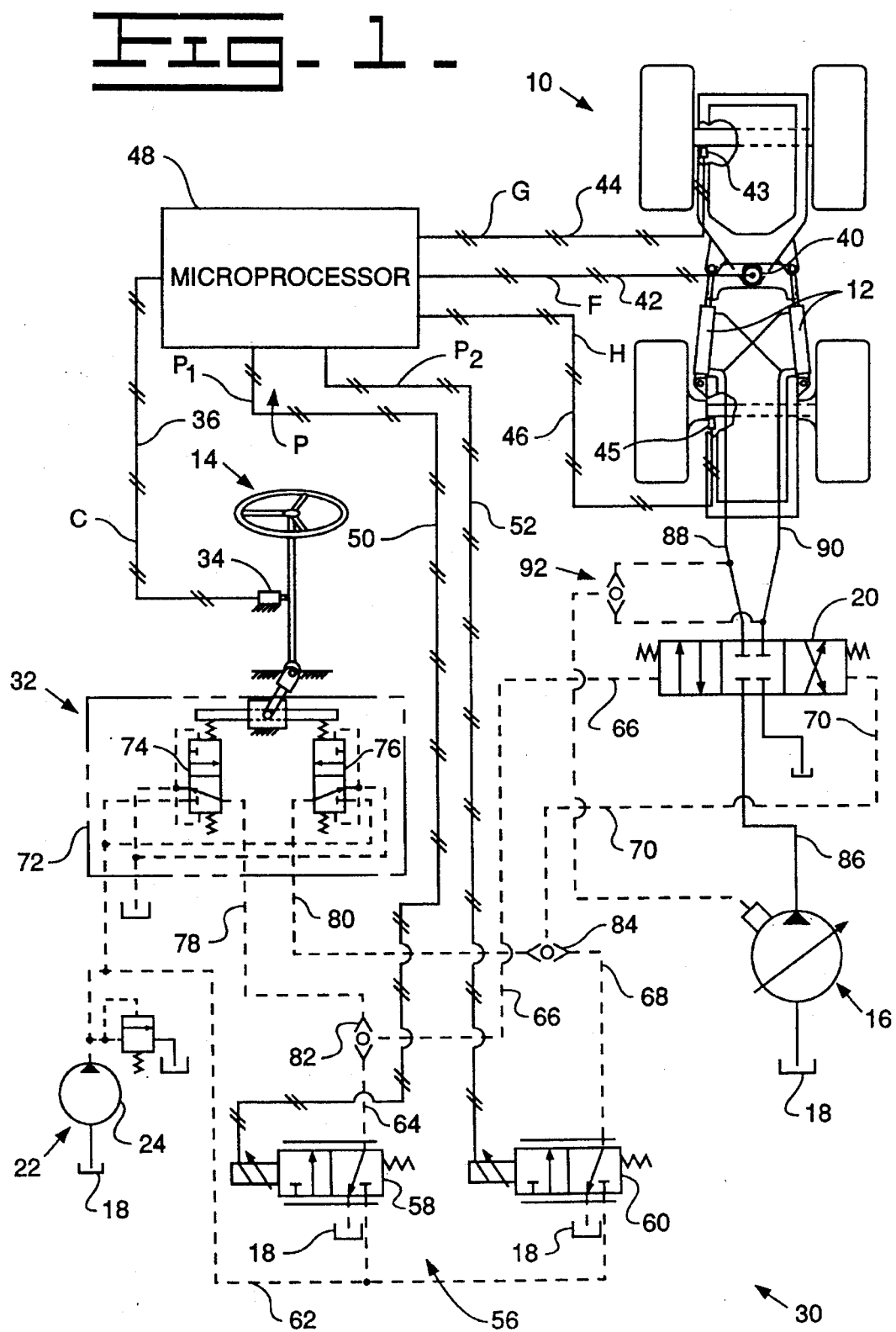
FIG. 1 is a partial diagrammatic and partial schematic representation of an electro-hydraulic steering system incorporating an embodiment of the present invention.

Referring to FIG. 1, an articulated machine 10 is illustrated and includes a pair of articulation cylinders, such as hydraulic cylinders 12, and a steer input mechanism 14. The articulated machine 10 also includes a hydraulic pump 16 which receives fluid from a reservoir 18 and delivers pressurized fluid to a directional control valve 20. A source of pressurized control fluid 22 is provided in the articulated machine and is operative to provide control fluid for shifting of the directional control valve 20. In the subject embodiment, the source of pressurized control fluid is a fixed displacement pump 24.

The articulated machine 10 includes an electro-hydraulic steering system 30 and a back-up steering control circuit 32 each operative to control articulation of the articulated machine 10. The electro-hydraulic steering system 30 includes a first sensor mechanism 34 operatively associated with the steer input mechanism 14 to sense the degree of steer input desired by the operator. An electrical command signal "C" representative of the desired steer input is delivered from the first sensor mechanism 34 through an electrical line 36. A second sensor mechanism 40 is mounted on the articulated machine 10 and operative to sense the degree of articulation thereof and deliver an electrical feedback signal "F" therefrom through an electrical line 42. A third sensor mechanism 43 is mounted on the articulated machine 10 relative to one axle thereof and operative to sense the ground speed of the articulated machine 10 and deliver a second electrical command signal "G" therefrom through an electrical line 44. A fourth sensor mechanism 45 is mounted on the articulated machine 10 relative to another drive axle thereof and operative to sense the ground speed and deliver a third electrical command signal "H" therefrom through an electrical line 46.

A microprocessor 48 is provided and operatively connected to the electrical lines 36,42,44,46 to receive the electrical signals "C,F,G,H". The microprocessor 48 processes the received signals "C,F,G,H" and delivers an electrical control signal "P" therefrom. In the subject arrangement, the electrical control signal "P" is broken into two separate signals "$P_1,P_2$" and delivered therefrom by respective electrical lines 50,52.

An electro-hydraulic valve mechanism 56 is provided and operatively disposed in the system between the source of pressurized control fluid 22 and the directional control valve 20 to control movement of the directional control valve 20. The electro-hydraulic valve mechanism 56 includes first and second electrically controlled proportional valves 58,60. The first and second electrically controlled proportional valve 58,60 are connected to the source of pressurized control fluid 22 by a pilot conduit 62. The first electrically controlled proportional valve 58 is connected to one end of the directional control valve 20 by pilot conduits 64,66 and the second electrically controlled proportional valve 60 is connected to the other end of the directional control valve 20 by pilot conduits 68,70. The electrical line 50 is connected to the first electrically controlled proportional valve 58 to control operation thereof and the electrical line 52 is connected to the second electrically controlled proportional valve 60 to control operation thereof.

Each of the first and second electrically controlled proportional valves 58,60 are two position valves that are spring biased to their first position at which the pilot conduit 64 is in fluid communication with the reservoir 18 while flow therethrough from conduit 62 is blocked and a second position at which fluid flow from the conduit 62 is in open communication with the conduit 64. Each of the first and second electrically controlled proportional valves 58,60 are proportionally movable towards their second position in response to the magnitude of the respective first and second electrical signals $P_1, P_2$ being directed thereto through the electrical lines 50,52.

The back-up steering control circuit 32 is a conventional steering valve mechanism 72 having first and second pressure reducing valves 74,76 therein that are responsive to a mechanical input from the steer input mechanism 14 to controllably direct pressurized fluid through respective pilot conduits 78,80. The pilot conduit 78 is connected to the pilot conduit 66 through a resolver valve 82 while the pilot conduit 80 is connected to the pilot conduit 70 through a resolver valve 84. The respective resolver valves 82,84 operate in a conventional manner to determine the highest pressure signal being delivered thereto and directing only the highest pressure therethrough.

The hydraulic pump 16 directs pressurized fluid through a conduit 86 to the directional control valve 20 and the respective conduit 88,90 connects the directional control valve 20 with the pair of articulation cylinders 12 in a conventional manner. A logic circuit 92 selects the highest pressure signal from the pair of articulation cylinders 12 and directs a signal representative thereof to the hydraulic pump 16 to control fluid flow therefrom in a conventional manner.

Figure 2:
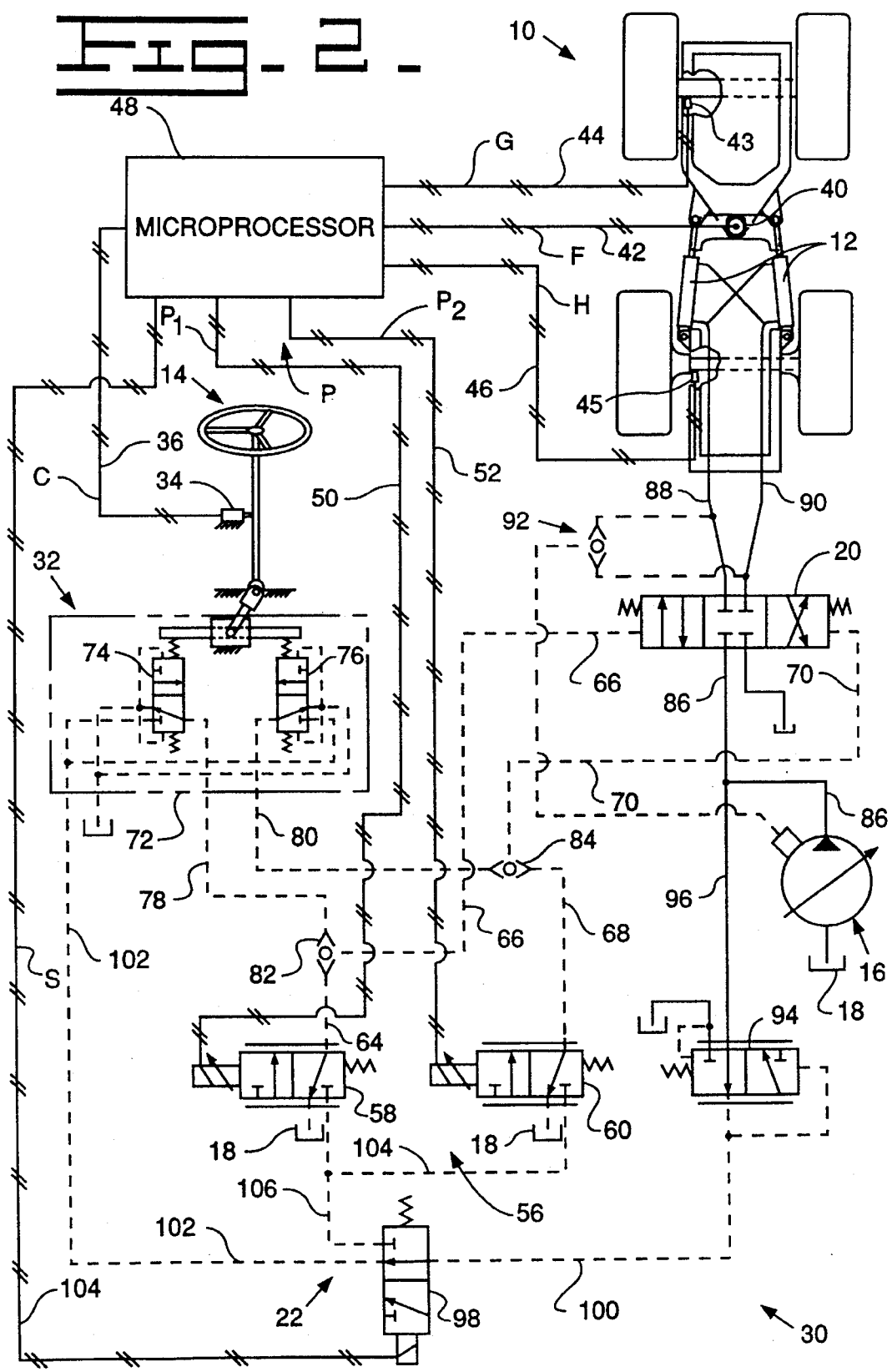
FIG. 2 is a partial diagrammatic and partial schematic representation of an electro-hydraulic steering system incorporating another embodiment of the present invention.

Referring to FIG. 2, another embodiment of the present invention is illustrated. All like elements have like element numbers. The major difference between the embodiment of FIG. 1 and FIG. 2 is the source of pressurized control fluid 22. In the embodiment of FIG. 1, the source of pressurized control fluid 22 is the fixed displacement pilot pump 24 while in the embodiment of FIG. 2, the source of pressurized control fluid 22 includes a pressure reducing valve 94 connected to the hydraulic pump 16 by a conduit 96 and a two-position, three-way valve 98 that is connected to the pressure reducing valve 94 by a conduit 100. A pilot conduit 102 connects the two-position, three-way valve 98 to the steering valve mechanism 72 while a conduit 104 connects the two-position, three-way valve 98 to the respective first and second electrically controlled proportional valves 58,60. The two-position, three-way valve 98 is spring biased to a first position at which the pilot conduit 100 is in communication with the pilot conduit 102. The two-position, three-way valve 98 is movable to its second position in response to an electrical signal "s" delivered thereto from the microprocessor 48 through an electrical line 104. In the second position thereof, the pilot conduit 100 is in fluid communication with a pilot conduit 106.

It is recognized that various forms of the subject electrohydraulic steering system 30 could be utilized without departing from the essence of the invention. For example, the first and second electrically controlled proportional valves 58,60 could be replaced by a single electrically controlled proportional valve that is a four-way valve which operatively controls more than one pilot signal therethrough. Likewise, the microprocessor 48 could be sensing other system parameters without departing from the essence of the invention.

INDUSTRIAL APPLICABILITY

In the operation of the articulated machine illustrated in FIG. 1, an input by the operator into the steer input mechanism 14 generates the signal "C" which is directed to the microprocessor 48. The microprocessor then delivers the electrical signal "$P_1$" to the first electrically controlled proportional valve 58 moving it towards its second position. The pressurized fluid from the source of pressurized control fluid 22 is directed thereacross, proportional to the electrical signal "$P_1$", to the one side of the directional control valve 20 moving it to an operative position at which pressurized fluid from the hydraulic pump 16 is directed to the pair of articulation cylinders 12 causing the articulated vehicle 10 to articulate in one direction. The second sensor mechanism 40 continuously senses the articulation angle of the articulated machine 10 and delivers the feedback signal "F" to the microprocessor 48. Once the articulation angle of the articulation machine 10 reaches an angle that is equivalent to the desired steer input represented by command signal "C", the microprocessor modifies the electrical signal "$P_1$" to the first electrically controlled proportional valve 58. As a result thereof, the desired articulation angle, as established by the operator's input to the steer input mechanism 14, is achieved and maintained. Conversely, when it is desired to articulate the machine 10 back to a straight ahead position, the operator makes an input to the steer input mechanism 14 which generates the command signal "C" representative thereof. The microprocessor 48 then delivers the electrical signal "$P_2$" to the second electrically controlled proportional valve 60. The second electrically controlled proportional valve 60 delivers pressurized fluid from the source of pressurized control fluid 22 to the other end of the directional control valve 20 moving it towards its second operative position. In the second operative position 20, pressurized fluid from the hydraulic pump 16 is directed to the pair of articulation cylinders 12 causing the machine 10 to articulate back towards a straight ahead position. As the machine 10 articulates back towards the desired straight ahead position, the second sensor mechanism 40 continually monitors the angle of articulation and delivers the feedback signal "F" representative thereof to the microprocessor 48. Once the desired position is achieved, the microprocessor 48 terminates the electrical signal "$P_2$" to the second electrically controlled proportional valve 60, thus, stopping the articulation of the machine 10. If it is desired to articulate further, the operator makes another input through the steer input mechanism 14, thus, generating the command signal "C" representative thereof. The microprocessor 48 again delivers the representative electrical signal "$P_2$" to the second electrically controlled proportional valve 60. The pressurized fluid from the second electrically controlled proportional valve 60 acts on the directional control valve 20 moving it to its second operative position to articulate the machine 10 in the desired direction. Once the desired angle of articulation is achieved, the second sensor mechanism 40 detects the angle and the feedback signal "F" representative thereof is delivered to the microprocessor 48. The electrical signal "$P_2$" to the second electrically controlled proportional valve 60 is changed thus stopping the articulation of the machine 10 at the desired position.

The third and fourth sensor mechanisms 43,45 detect the ground speed of the articulated machine 10 and directs the representative signals "G,H" to the microprocessor 48 to control the gain of the steering relative thereto. It is recognized that only one of the third and fourth sensor mechanisms 43,45 is required. However, by using both of the third and fourth sensor mechanisms 43,45, the actual ground speed can be more accurately determined in the event one wheel spins due to slippery conditions. If the machine 10 is traveling at a slow ground speed, the microprocessor delivers a predetermined signal "$P_1$" or "$P_2$" to the appropriate first or second electrically controlled proportional valves 58,60. The directional valve 20 is moved to one of its operative positions in response thereto providing flow to the pair of articulation cylinders 12 to steer the machine 10 at a desired rate of articulation based on a given steer input. As the ground speed of the vehicle 10 increases and the steer input has not changed, the microprocessor senses the increase in ground speed through the respective signals "G,H" and reduces the respective control signal "$P_1/P_2$" being delivered to the respective first or second electrically controlled proportional valve 58,60. Consequently, the respective pressurized signals being delivered to the opposite ends of the directional control valve 20 is less, thus, moving the directional control valve 20 to the smaller displacement position. Therefore, the pair of articulation cylinders 12 move at a slower rate to lessen the rate of articulation of the machine 10. By controlling the rate of articulation with respect to the ground speed of the machine 10, the machine 10 is more effectively controlled when operating at higher ground speeds.

The steering valve mechanism 72 is operated simultaneously and in parallel with the operation of the electro-hydraulic steering system. In order to insure that the electro-hydraulic steering system 30 has priority over the steering valve mechanism 72, the system is designed such that the pressure signal being delivered from the respective first or second electrically controlled proportional valve 58,60, for a given steer input to the steer input mechanism 14, is larger than the pressure signals being delivered to the respective pilot conduit 78,80 from the corresponding pressure reducing valve 74,76 of the steering valve mechanism 72. Since the respective resolver valve 82,84 deliver only the larger of the two pressure signals received, the pressure signal in the pilot conduit 64 is directed through the resolver 82 to the conduit 66 and the pressure signal in the pilot conduit 78 is blocked. Likewise, the pressure signal in the conduit 68 is delivered through the resolver valve 84 to the conduit 70 and the pressurized fluid in the pilot conduit 80 is blocked. In the event of an electrical system failure, the first and second electrically controlled proportional valves 58,60 are spring biased to their first position at which the conduit 64 and the pilot conduit 68 are respectively connected with the reservoir 18. Consequently, the pressurized pilot fluid in the respective conduit 78,80 is directed through the respective resolver valves 82,84 to the ends of the directional control valve 20 to direct pressurized fluid from the hydraulic pump 16 to the pair of articulation cylinders 12 for steering of the machine 10.

Referring to the embodiment set forth in FIG. 2, the operation of the electro-hydraulic steering system is identical to that set forth with respect to FIG. 1 and the operation of the back-up steering control circuit 32 is likewise identical to the operation of the back-up steering control circuit 32 of FIG. 1. The source of pressurized control fluid 22 in the embodiment of FIG. 2 is obtained through the pressure reducing valve 94 that is connected to the hydraulic pump 16 through the conduit 96,86. The pressurized fluid is then directed through the pilot conduit 100 to the two-position, three-way valve 98. When the electro-hydraulic steering system 30 is functional, the control signal "S" is delivered to the two-position, three-way valve 98 moving the valve to its second operative position at which the pressurized fluid in the pilot conduit 100 is in communication with the respective first and second electrically controlled proportional valves 58,60 through the pilot conduit 106. In the event of an electrical system failure, the electrical signal "S" is interrupted and the two-position, three-way valve 98 is biased to its first operative position at which the pressurized fluid in the pilot conduit 100 is connected to the respective pressure reducing valves 74,76 of the steering valve mechanism 72 through the pilot conduit 102. The steering valve mechanism 72 in turn controls the steering of the articulated machine 10 as described with respect to FIG. 1.

In view of the foregoing, it is readily apparent that the electro-hydraulic steering system 30 set forth herein provides a system that effectively steers the articulated machine 10 to a desired steer position without the operator having to make numerous corrective adjustments thereto. Likewise, the electro-hydraulic steering system 30 is simple in construction and reliable in operation. Furthermore, in the event of an electrical system failure, the back-up steering control circuit 32 is automatically functional without the operator having to make any special inputs or adjustments thereto.

Other aspects, objects and advantages of the invention can be obtained from a study of the drawings, the disclosure and the appended claims.

We claim:

1. An electro-hydraulic steering system for an articulated machine having a steer input mechanism responsive to an operator input, a pair of articulation cylinders, a hydraulic pump, a source of pressurized control fluid and a directional control valve operatively connected between the hydraulic pump and the pair of articulation cylinders, the electro-hydraulic steering system comprising:

a first sensor mechanism operative, when installed, to sense the degree of steering input from the steering mechanism and deliver an electrical command signal (C) therefrom representative of the desired steer angle;

a second sensor mechanism operative, when installed, to sense the degree of articulation of the machine and deliver an electrical feedback signal (F) therefrom representative of the articulation angle;

an electro-hydraulic valve mechanism operatively connected between the source of pressurized control fluid and the directional control valve to control movement of the directional control valve; and a microprocessor operative to receive and compare the electrical signals from the first and second sensor mechanisms and deliver an electrical control signal (P) to the electro-hydraulic valve mechanism to actuate the directional control valve in response to the command signal of the desired steer angle and to deactivate the directional control valve in response to the feedback signal once the desired articulation angle is achieved.

2. The electro-hydraulic steering system of claim 1 wherein the electro-hydraulic valve mechanism includes first and second electrically controlled proportional valves and the electrical control signal includes first and second electrical signals ($P_1, P_2$) operatively connected to the respective first and second electrically controlled proportional valves.

3. The electro-hydraulic steering system of claim 2 including a third sensor mechanism operative to sense the ground speed of the machine and deliver a second electrical command signal (G/H) to the microprocessor that is representative of the machine ground speed and the microprocessor compares the second electrical command signal to the rate of articulation and reduces the rate of articulation as the ground speed increases.

4. The electro-hydraulic steering system of claim 2 including a back-up steering control circuit having a steering valve mechanism operatively connected to the steer input mechanism to selectively deliver pressurized fluid from the source of pressurized control fluid to control movement of the directional control valve.

5. The electro-hydraulic steering system of claim 4 wherein the back-up steering control circuit is automatically operative in the event of an electrical failure in the electro-hydraulic steering system to control steering of the articulated machine.

6. The electro-hydraulic steering system of claim 5 wherein the source of pressurized control fluid is a fixed displacement pump connected in parallel to both the electro-hydraulic valve mechanism and the steering valve mechanism.

7. The electro-hydraulic steering system of claim 5 wherein a two-position valve selectively interconnects the source of pressurized control fluid with one of the electro-hydraulic valve mechanisms and the steering valve mechanism.

8. The electro-hydraulic steering system of claim 7 wherein the two-position valve is spring biased to the first position directing fluid from the source of pressurized control fluid to the steering valve mechanism and movable to the second position in response to an electrical signal (S) from the microprocessor to direct fluid from the source of pressurized control fluid to the electro-hydraulic valve mechanism.

* * * * *